(12) United States Patent
Hayama et al.

(10) Patent No.: US 8,660,749 B2
(45) Date of Patent: Feb. 25, 2014

(54) MOTOR VEHICLE STEERING SYSTEM

(75) Inventors: Ryouhei Hayama, Nabari (JP); Shiro Nakano, Osaka (JP); Tomoyasu Kada, Kaizuka (JP)

(73) Assignee: JTEKT Corporation, Osaka (JP)

( * ) Notice: Subject to any disclaimer, the term of this patent is extended or adjusted under 35 U.S.C. 154(b) by 484 days.

(21) Appl. No.: 11/797,657

(22) Filed: May 4, 2007

(65) Prior Publication Data

US 2007/0265752 A1    Nov. 15, 2007

(30) Foreign Application Priority Data

May 9, 2006    (JP) .................................. 2006-130438

(51) Int. Cl.
*B62D 6/00*    (2006.01)

(52) U.S. Cl.
USPC ............... 701/41; 180/204; 180/6.4; 180/6.6; 180/402; 180/446

(58) Field of Classification Search
USPC ............... 701/41; 180/204, 6.2, 6.6, 402, 446
See application file for complete search history.

(56) References Cited

U.S. PATENT DOCUMENTS

| | | | | |
|---|---|---|---|---|
| 4,720,790 A * | 1/1988 | Miki et al. | ...................... | 701/41 |
| 5,307,892 A * | 5/1994 | Phillips | .......................... | 180/422 |
| 5,398,953 A * | 3/1995 | Shimizu | ........................ | 180/446 |
| 5,528,497 A * | 6/1996 | Yamamoto et al. | ............. | 701/41 |
| 5,704,446 A * | 1/1998 | Chandy et al. | ................ | 180/446 |
| 5,845,222 A * | 12/1998 | Yamamoto et al. | ............. | 701/41 |
| 5,999,870 A * | 12/1999 | Tatsumi et al. | ................. | 701/43 |
| 6,087,975 A * | 7/2000 | Sugimoto et al. | ............... | 342/70 |
| 6,185,492 B1 * | 2/2001 | Kagawa et al. | ................. | 701/41 |
| 6,212,452 B1 * | 4/2001 | Shimizu et al. | ................. | 701/41 |
| 6,219,604 B1 * | 4/2001 | Dilger et al. | .................... | 701/41 |
| 6,278,912 B1 * | 8/2001 | Amano | ............................. | 701/1 |
| 6,397,127 B1 * | 5/2002 | Meyers et al. | ................... | 701/1 |
| 6,422,335 B1 * | 7/2002 | Miller | ......................... | 180/446 |
| 6,778,889 B2 * | 8/2004 | Kato et al. | ..................... | 701/41 |
| 6,802,226 B2 * | 10/2004 | Ono et al. | ................ | 73/862.325 |
| 2002/0033300 A1 * | 3/2002 | Takeuchi et al. | .............. | 180/446 |
| 2003/0055545 A1 * | 3/2003 | Uenuma et al. | ................. | 701/41 |
| 2004/0133324 A1 * | 7/2004 | Yasui et al. | ..................... | 701/41 |
| 2004/0148078 A1 * | 7/2004 | Nakano et al. | .................. | 701/41 |
| 2005/0125153 A1 * | 6/2005 | Matsumoto et al. | .......... | 701/300 |
| 2005/0273239 A1 | 12/2005 | Turner et al. | | |
| 2006/0080016 A1 | 4/2006 | Kasahara et al. | | |
| 2007/0169984 A1 * | 7/2007 | Ogawa et al. | ................. | 180/402 |

FOREIGN PATENT DOCUMENTS

| | | |
|---|---|---|
| DE | 195 36 989 A1 | 4/1996 |
| EP | 0 927 677 A1 | 7/1999 |
| EP | 1097855 | 5/2001 |
| JP | 5-77751 | 3/1993 |
| JP | 5-147549 | 6/1993 |
| JP | 6-107188 | 4/1994 |

(Continued)

*Primary Examiner* — John Q Nguyen
*Assistant Examiner* — Kyung Kim
(74) *Attorney, Agent, or Firm* — Rabin & Berdo, P.C.

(57) ABSTRACT

A motor vehicle steering system steers vehicle wheels in response to the operation of an operation member for steering a vehicle. The system includes a rutted road judging unit which judges whether the vehicle is driving on a rutted road or not, and a steering enhancement control unit which enhances steering of vehicle wheels in response to operation of the operation member when the rutted road judging unit judges that the vehicle is driving on a rutted road than when the rutted road judging unit judges that the vehicle is not driving on a rutted road.

16 Claims, 9 Drawing Sheets

(56) References Cited

FOREIGN PATENT DOCUMENTS

| | | |
|---|---|---|
| JP | 2000-025630 | 1/2000 |
| JP | 2000-033879 | 2/2000 |
| JP | 2001-180511 | 7/2001 |
| JP | 2001-191937 | 7/2001 |
| JP | 2001260921 | 9/2001 |
| JP | 2004-98732 | 4/2004 |
| JP | 2005-343456 | 12/2005 |
| JP | 2006-002805 | 1/2006 |
| JP | 2006-056374 | 3/2006 |

\* cited by examiner

MOTOR VEHICLE STEERING SYSTEM

BACKGROUND OF THE INVENTION

1. Field of the Invention

The present invention relates to a motor vehicle steering system by which a steerable vehicle wheel is steered according to operation of an operation member.

2. Description of Related Art

An example of a motor vehicle steering system is an electric power steering apparatus in which steering assist force generated by an electric motor is transmitted to a steering mechanism. An electric power steering apparatus is equipped with a control device which drives an electric motor according to operation torque which is applied to a steering wheel by a driver. Due to this structure, appropriate steering assist force according to the operation torque can be generated.

Another example of a motor vehicle steering system is a steer-by-wire system (refer to EP1097855 A2). In a steer-by-wire system, there is no mechanical connection between a steering wheel and a steering mechanism. In this system, while operation angle of the steering wheel is detected by a sensor, driving force of a steering actuator, which is controlled in accordance with the output of the sensor, is transmitted to the steering mechanism. It is possible to freely set a ratio of a steering angle (steering angle ratio) of the steerable vehicle wheel to an operation angle of the steering wheel. Moreover, control of the steering angle by the control of the steering actuator can be performed independently from operation of the steering wheel. Thus, it becomes possible to perform stabilization control of a vehicle behavior by the steering control.

The steer-by-wire system is not the only a motor vehicle steering system which can change the steering angle ratio. For example, in a variable gear ratio steering system in which a variable transmission ratio unit, which can change rotation transmission ratio, is intervened, variable control of the steering angle ratio is also possible (refer to Japanese Unexamined Patent Publication No. 2006-2805).

In a stabilization control of a vehicle behavior adopted in steer-by-wire system or the like, target yaw rate is calculated based on the vehicle speed and operation angle, and steering angle of the steerable vehicle wheels is feedback-controlled so that difference between detected actual yaw rate and the target yaw rate becomes zero.

In a condition where a vehicle travels straight on a rutted road which is uneven surface road where wheel ruts or wheel track furrows (depressions left after wheels of a vehicle passed) are formed, the conventional stabilization control of a vehicle behavior cannot sufficiently work. That is, on a rutted road, a motor vehicle is prone to wobble and steering is easy to be taken or entrapped. Therefore, a driver must swiftly and dynamically control the steering wheel to settle down the vehicle attitude.

To realize vehicle attitude control, which is equivalent to the steering control by a driver, by use of a conventional stabilization control of a vehicle behavior, feedback gain must be set large to raise the responsiveness enough. This is so because yaw rate generated in a vehicle traveling straight is very small.

However, if the feedback gain is set large, when driving on an ordinary road which is a level road without ruts, a large control amount is generated by minute change of a yaw rate signal caused by swell of the road or vibration of the vehicle. Therefore, this may more likely to increase wobble of the vehicle.

SUMMARY OF THE INVENTION

A purpose of the present invention is to provide a motor vehicle steering system which can easily stabilize behavior of a vehicle on both rutted and ordinary roads.

A motor vehicle steering system of the present invention steers vehicle wheels in response to the operation of an operation member for steering a vehicle. The motor vehicle steering system includes a rutted road judging unit which judges whether the vehicle is traveling on a rutted road or not and a steering enhancement control unit which enhances steering of vehicle wheels in response to operation of the operation member when the rutted road judging unit judges that the vehicle is driving on a rutted road than when the rutted road judging unit judges that the vehicle is not driving on a rutted road.

According to this configuration, when the vehicle is traveling on a rutted road, steering of the vehicle wheels is enhanced in response to the operation of the operation member than when the vehicle is not traveling on a rutted road (that is, traveling on an ordinary road). Thus, operation of the operation member to stabilize the position of the vehicle by steering the vehicle wheel dynamically and swiftly while driving on a rutted road is reduced and a driver's burden to steer a vehicle is also reduced. Hence, it is possible to stabilize the behavior of a vehicle while traveling on a rutted road. On the other hand, while traveling on an ordinary road, steering of the vehicle wheel is not so much enhanced as while traveling on a rutted road. Therefore, wobble of a vehicle can be suppressed and behavior of the vehicle can be kept stabilized.

The steering enhancement control unit may include a steering ratio control unit which sets larger ratio of steering angle of the vehicle wheels (steering ratio) to an operation amount (for example, operation angle or operation torque) of the operation member when traveling on a rutted road than when not traveling on a rutted road.

According to this configuration, while traveling on a rutted road, steering ratio becomes larger than when traveling on an ordinary road. Therefore, with a small operation of the operation member, vehicle wheels can be dynamically and swiftly steered, and behavior of a vehicle can be stabilized while reducing a driver's burden.

The steering ratio control unit may set a ratio of a steering angle of vehicle wheels to an operation amount of the operation member according to time differential component of the operation amount (for example, operation angle or operation torque) of the operation member while traveling on a rutted road.

The time differential component may include time-based first-order differential component of the operation amount (corresponds to the rotation speed of operation) and/or time-based second-order differential component of the operation amount (corresponds to acceleration of the operation).

According to this configuration, while traveling on a rutted road, a steering ratio of vehicle wheels is determined in accordance with the rotation speed and/or the acceleration of operation of the operation member. Therefore, it is possible to quickly steer the vehicle wheels in response to the rotation speed and/or the acceleration of operation of the operation member. Thus, steering angle of the vehicle wheels is changed more quickly in response to the operation of the operation member. As a result, while reducing the steering burden of a driver, it is possible to steer the vehicle wheels dynamically and swiftly.

The motor vehicle steering system may further include a steering assist force generation unit. In this case, it is preferable that the steering enhancement control unit includes a steering assist control unit which controls the steering assist force generation unit so that steering assist force becomes larger when traveling on a rutted road than when not traveling on a rutted road.

According to this configuration, steering assist force becomes larger when traveling on a rutted road than when traveling on an ordinary road. Therefore, driver's burden is reduced. As a result, steering is enhanced and vehicle wheels can be steered easily and steering burden for stabilization of a vehicle behavior while traveling on a rutted road is reduced.

The motor vehicle steering system may further include an operation reaction force adjusting unit which adjusts operation reaction force of the operation member. In this case, the steering enhancement control unit may include an operation reaction force control unit which controls the operation reaction force adjusting unit so that operation reaction force becomes smaller when traveling on a rutted road than when not traveling on a rutted road.

According to this configuration, operation reaction force when traveling on a rutted road becomes smaller than that when traveling on an ordinary road. Therefore, steering is enhanced and vehicle wheels can be easily steered. As a result, when traveling on a rutted road, a driver can dynamically and swiftly steer the vehicle wheels with small steering burden and can stabilize the behavior of a vehicle easily.

Above-mentioned and other purposes, characteristics, and effects of the present invention will be disclosed in the following embodiments explained with reference to attached drawings.

DETAILED DESCRIPTION OF PREFERRED EMBODIMENTS

Figure 1:
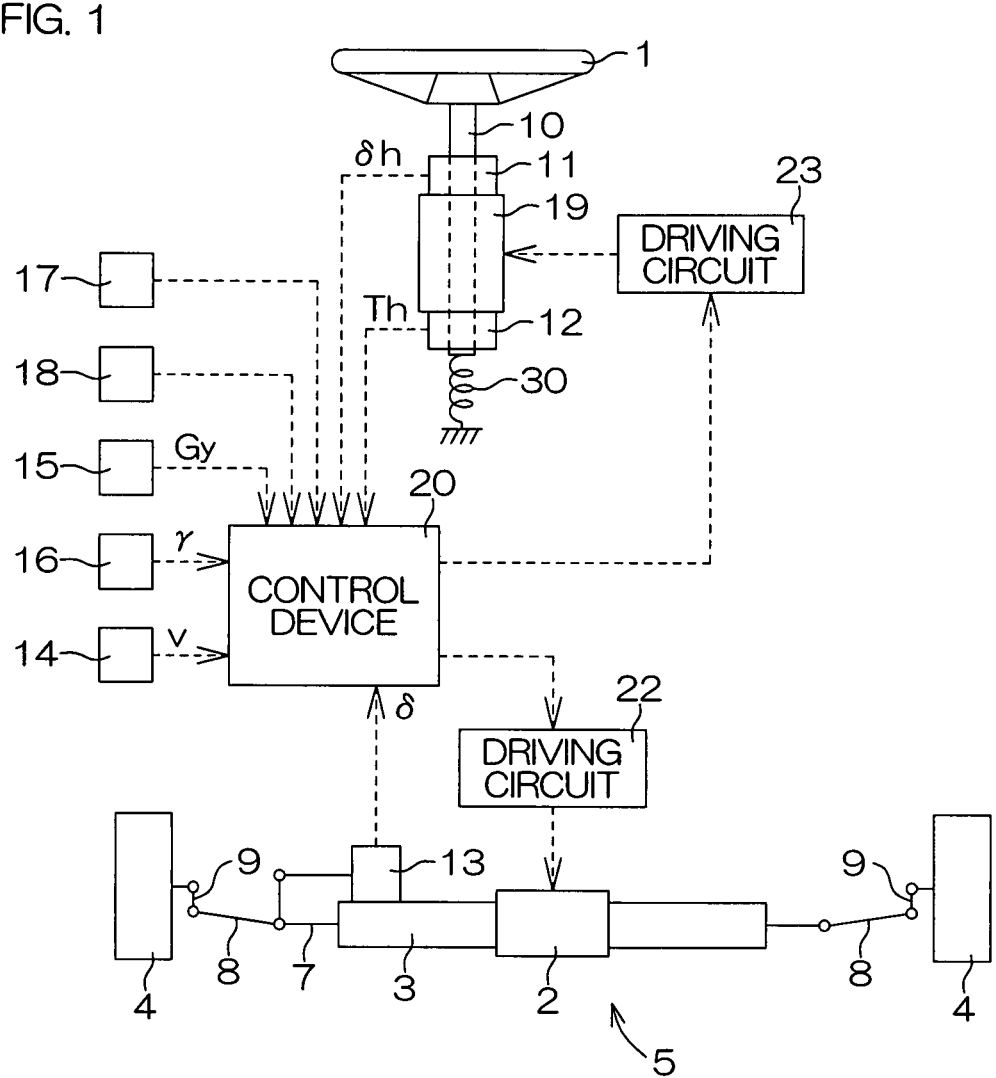
FIG. 1 is an explanatory diagram for explaining configuration of a motor vehicle steering system according to an embodiment of the present invention.

FIG. 1 is an explanatory diagram for explaining configuration of a motor vehicle steering system according to an embodiment of the present invention and shows configuration of a steer-by-wire system. This motor vehicle steering system includes a steering wheel 1 as an operation member which is operated by a driver for controlling a vehicle, a steering actuator 2 which is driven in response to the rotational operation of the steering wheel 1, and a steering gear 3 which transmits the driving force of the steering actuator 2 to left and right front wheels 4 which serve as steerable vehicle wheels. Between the steering wheel 1 and a steering mechanism 5 which includes the steering actuator 2 and the like, there is no mechanical connection which enables operation torque applied to the steering wheel 1 to be mechanically transmitted to the steering mechanism 5. According to the operation amount (operation angle or operation torque) of the steering wheel 1, the steering actuator 2 is drive controlled and thus, the wheels 4 which are steered.

The steering actuator 2 can be configured by an electric motor such as a known brushless motor or the like. The steering gear 3 has a movement converting mechanism which converts rotation movement of an output shaft of the steering actuator 2 into linear axial motion of a steering rod 7 (linear motion in left-right direction of the vehicle). Movement of the steering rod 7 is transmitted to the wheels 4 through a tie rod 8 and a knuckle arm 9, and toe angle (steering angle) of the wheels for changes. As the steering gear 3, known one can be used. As long as the movement of the steering actuator 2 can be transmitted to the wheels 4 so that steering angle is changed, there is no limitation to configuration of the steering gear 3. A wheel alignment is set so that the wheels 4 can return to straight traveling steering position by self-aligning torque in a condition where the steering actuator 2 is not driven.

The steering wheel 1 is connected to a rotation shaft 10 which is supported on the vehicle body side so as to rotate freely. The rotation shaft 10 has a reaction force actuator 19 (an operation reaction force adjusting unit) which generates reaction force torque working on the steering wheel 1. The reaction force actuator 19 can be configured by an electric motor such as a brushless motor which has an output shaft integrated with the rotation shaft 10.

A resilient member 30 for providing resilience to return the steering wheel 1 to the straight traveling steering position is provided between the vehicle body and the rotation shaft 10. This resilient member 30 can be configured by, for example, a spring for providing resilience to the rotation shaft 10. When the reaction force actuator 19 does not provide torque to the rotation shaft 10, the steering wheel 1 returns to the straight traveling steering position by resilience of the resilient member 30.

To detect steering angle (rotation angle) δh of the steering wheel 1, an angle sensor 11 for detecting rotation angle of the rotation shaft 10 is provided. Moreover, to detect operation torque Th, which is applied to the steering wheel 1 by a driver, a torque sensor 12 for detecting torque transmitted from the rotation shaft 10 is provided. In addition, a steering angle sensor 13 for detecting a steering angle δ of a vehicle (steering angle of the steering mechanism 5) is configured by a potentiometer which detects working amount of the steering rod 7 corresponding to the steering angle. Furthermore, a speed sensor 14 for detecting a vehicle speed V, a lateral acceleration sensor 15 for detecting a lateral acceleration Gy of a vehicle, and a yaw rate sensor 16 for detecting yaw rate γ of a vehicle are provided. Still furthermore, vehicle height sensors 17 and 18 for detecting amount of changes of vehicle heights in left and right are provided. The vehicle height sensors 17 and 18 may be the ones which are provided, for example, in connection with suspensions of left and right front wheels (or rear wheels) and detect the amount of change of distance between vehicle body and tires. More specifically, the vehicle height sensors 17 and 18 can be configured, for example, by sensors which detect angle of suspension arms.

The angle sensor 11, the torque sensor 12, the steering angle sensor 13, the speed sensor 14, the lateral acceleration sensor 15, the yaw rate sensor 16, and the vehicle height sensors 17 and 18 are connected with a control device 20 which is configured by a computer. The control device 20 controls the steering actuator 2 and the reaction force actuator 19 through driving circuits 22 and 23.

Figure 2:
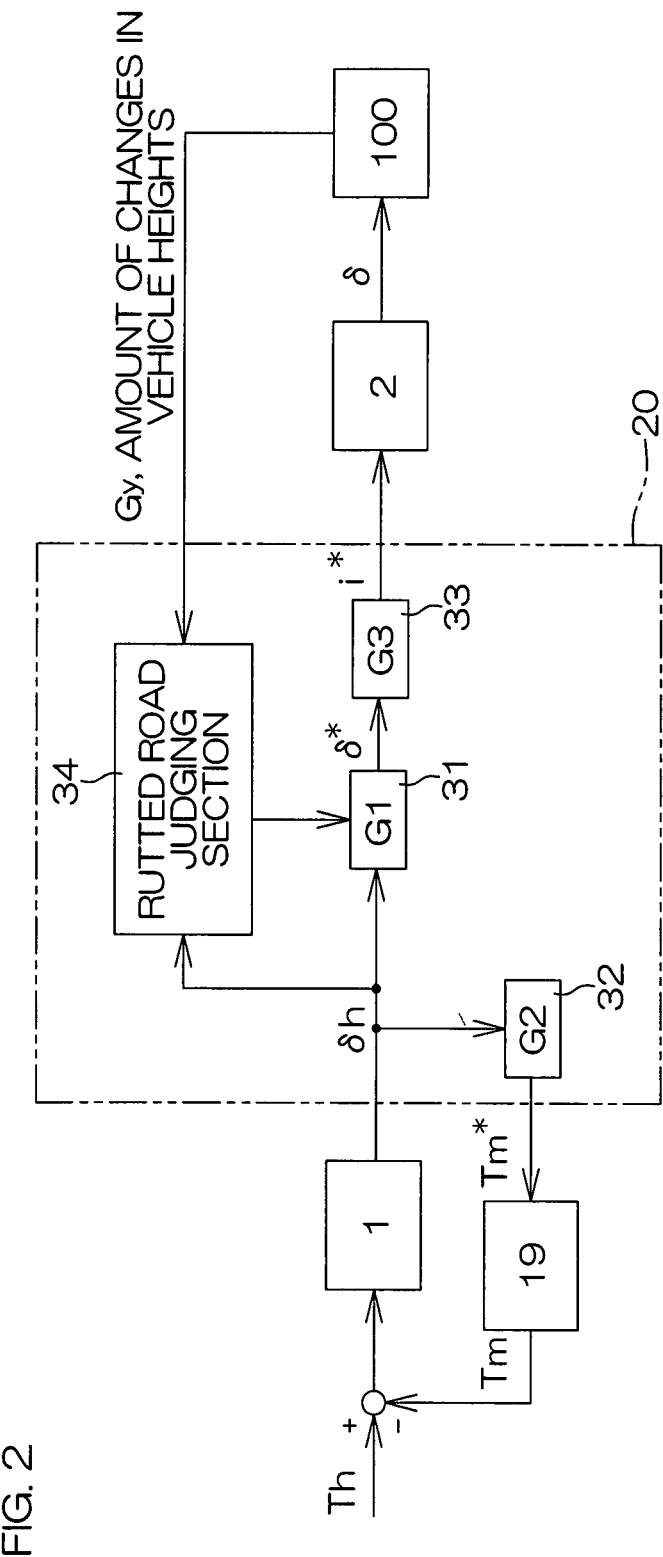
FIG. 2 is a control block diagram according to a first embodiment.

FIG. 2 is a control block diagram of the control device 20. Operation torque Th is applied to the steering wheel 1 by a driver while reaction force torque Tm is applied by the reaction force actuator 19. The operation angle δh as operation amount of the steering wheel 1 is detected by the angle sensor 11 and inputted to the control device 20. The control device 20 includes a target steering angle computing section 31 which obtains a target steering angle δ* based on the operation angle δh and a transfer function G1, a target reaction force torque computing section 32 which obtains a target reaction force torque Tm* based on the operation angle δh and a transfer function G2, and a target electric current computing section 33 which computes a target electric current value i* to be supplied to the steering actuator 2 based on the target steering angle δ* and a transfer function G3. They are functional processing units realized by software processing when the control device 20 performs a predetermined program. The control device 20 supplies electric current which corresponds to the target electric current value i* obtained by the target electric current computing section 33 from the driving circuit 22 to the steering actuator 2. As a result, behavior of a vehicle 100 is changed. Moreover, the control device 20 controls the reaction force actuator 19 via the driving circuit 23 according to the target reaction force torque Tm*.

The control device 20 has a rutted road judging section 34 as functional processing unit which is also realized by software processing. The rutted road judging section 34 judges whether the vehicle 100 is traveling on a rutted road or not on the basis of operation angle δh detected by the angle sensor 11, difference in heights between left and right of the vehicle 100 which is obtained from the outputs of the vehicle height sensors 17 and 18, and lateral acceleration Gy detected by the lateral acceleration sensor 15. Based on the judgment by the rutted road judging section 34, the transfer function G1 of the target steering angle computing section 31 is switched.

More specifically, when the rutted road judging section 34 judges that the vehicle 100 is not traveling on a rutted road and therefore the vehicle 100 is traveling on an ordinary road, the target steering angle δ* is expressed by, for example, the following formula (1)

$$\delta^* = G1 \cdot \delta h = K_v \cdot K_o \cdot \delta h \quad (1)$$

where $K_v$ is vehicle speed coefficient and may be a function of vehicle speed V (for example, a value proportional to the vehicle speed V). Moreover, $K_o$ is operation angle coefficient and is a function of the operation angle δh.

When the rutted road judging section 34 judges that the vehicle is traveling on a rutted road, for example, a target steering angle δ* is obtained by the following formula (2).

$$\delta^* = G1 \cdot \delta h = K_v \cdot K_1 \cdot K_2 \cdot K_3 \cdot \delta h \quad (2)$$

where $K_1$, $K_2$, and $K_3$ are coefficients. Here, $K_1$ is a function of the operation angle δh, and $K_1$ may be equal to $K_o$, or with regard to an arbitrary operation angle δh, $|K_1| \geq |K_o|$ is also acceptable. Moreover, $K_2$ is a function of time-based first-order differential value δh' of the operation angle δh, and $K_3$ is a function of time-based second-order differential value δh'' of the operation angle δh.

Value δ*/δh, which is obtained by dividing the both sides of the formulae (1) and (2) by the operation angle δh, is a target value of the steering angle ratio (steering ratio).

The coefficients $K_v$, $K_o$, $K_1$, $K_2$, and $K_3$ may be set based on, for example, a predetermined map (table), and examples of functions corresponding to these maps are shown in FIGS. 3(a), 3(b), 3(c) and 3(d), respectively.

Figure 3A:
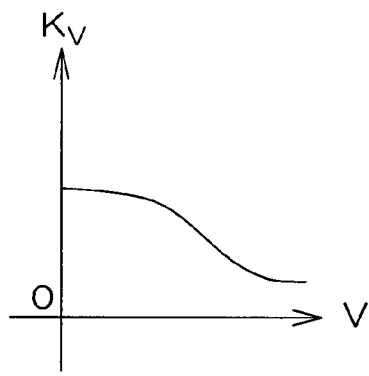
FIGS. 3(a) to 3(d) show examples of a map to set a coefficient for obtaining a target steering angle.

FIG. 3(a) shows the coefficient $K_v$, and in this example, the coefficient $K_v$ is set to be smaller as the vehicle speed V becomes larger.

Figure 3B:
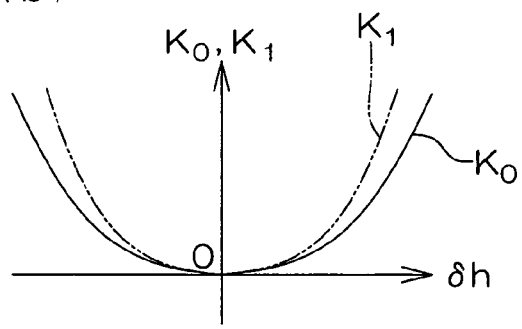

FIG. 3(b) shows coefficients $K_o$ and $K_1$. In this example, the coefficients are set to be $|K_1| > |K_o|$ and steering angle ratio is set to be larger when traveling on a rutted road than when traveling on an ordinary road. Thus, when traveling on a rutted road, steering angle δ can be dynamically and swiftly changed with a smaller amount of steering operation than when traveling on an ordinary road.

The coefficients $K_o$ and $K_1$ ($K_o \geq 0$, $K_1 \geq 0$) are set to be zero when the operation angle δh is zero. Moreover, the coefficients $K_o$ and $K_1$ are suppressed to be small values when operation angle absolute value |δh| is a relatively small value near neutral position, and set to be large values when operation angle absolute value |δh| is a relatively large value near steering endpoint. More specifically, when the operation angle absolute value |δh| is within a range near the neutral position or steering midpoint, increasing rate of the coefficients $K_o$ and $K_1$ to increase of the operation angle absolute value |δh| is small, while increasing rate of the coefficients $K_o$ and $K_1$ to increase of the operation angle absolute value |δh| is large when the operation angle absolute value |δh| is within a range near the steering endpoint. Thus, while suppressing the change of the steering angle δ near the neutral position, the steering angle δ can be changed largely by small steering operation near the steering endpoint. Therefore, it is possible to reduce the burden of steering operation when parking a vehicle or the like.

Figure 3C:
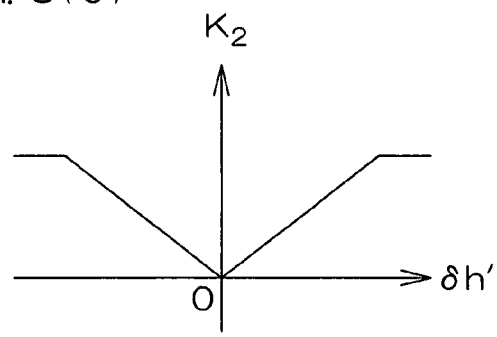

FIG. 3(c) shows coefficient $K_2$. The coefficient $K_2$ ($K_2 \geq 0$) is set to be zero as the time-based first-order differential value δh' is zero. Moreover, the coefficient $K_2$ is set to be larger as the operation angle time-based first-order differential value δh' becomes larger within a range with a predetermined upper limit. In an example of FIG. 3(c), it is set to be approximately proportional to an absolute value of the operation angle time-based first-order differential value δh'. Thus, as the operation speed of the steering wheel 1 is faster (that is, as the absolute value of the operation angle time-based first-order differential value δh' is larger), ratio of steering angle (steering angle ratio) δ to the operation angle δh becomes larger. Therefore, more swifter (quicker) steering is possible.

Figure 3D:
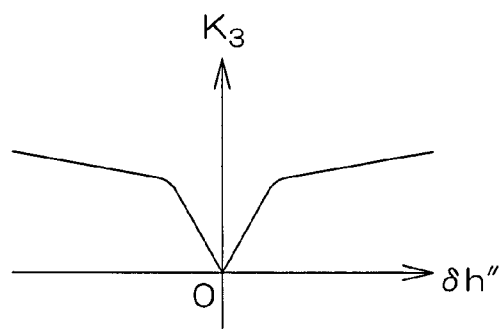

FIG. 3(d) shows the coefficient $K_3$. The coefficient $K_3$ ($K_3 \geq 0$) is set to be zero when the time-based second-order differential value δh'' is zero. Moreover, the coefficient $K_3$ is set to be larger as the absolute value of the operation angle time-based second-order differential value δh'' becomes larger within a range with a predetermined upper limit. Thus, as the operation acceleration of the steering wheel 1 is swifter (that is, as the absolute value of the operation angle time-based second-order differential value δh'' is larger), ratio of steering angle (steering angle ratio) δ to the operation angle δh becomes larger. Therefore, swifter (quicker) steering in response to the operation acceleration is possible.

Thus, as a result of setting the target steering angle δ* according to the above-mentioned formula (2) while traveling on a rutted road, change of steering angle δ to operation angle δh becomes larger and occurs faster than when traveling on an ordinary road. Therefore, a driver can maintain straight traveling state of the vehicle without operating the steering wheel 1 so dynamically and swiftly while traveling on a rutted road. Hence, operation burden of a driver can be reduced.

Figure 4:
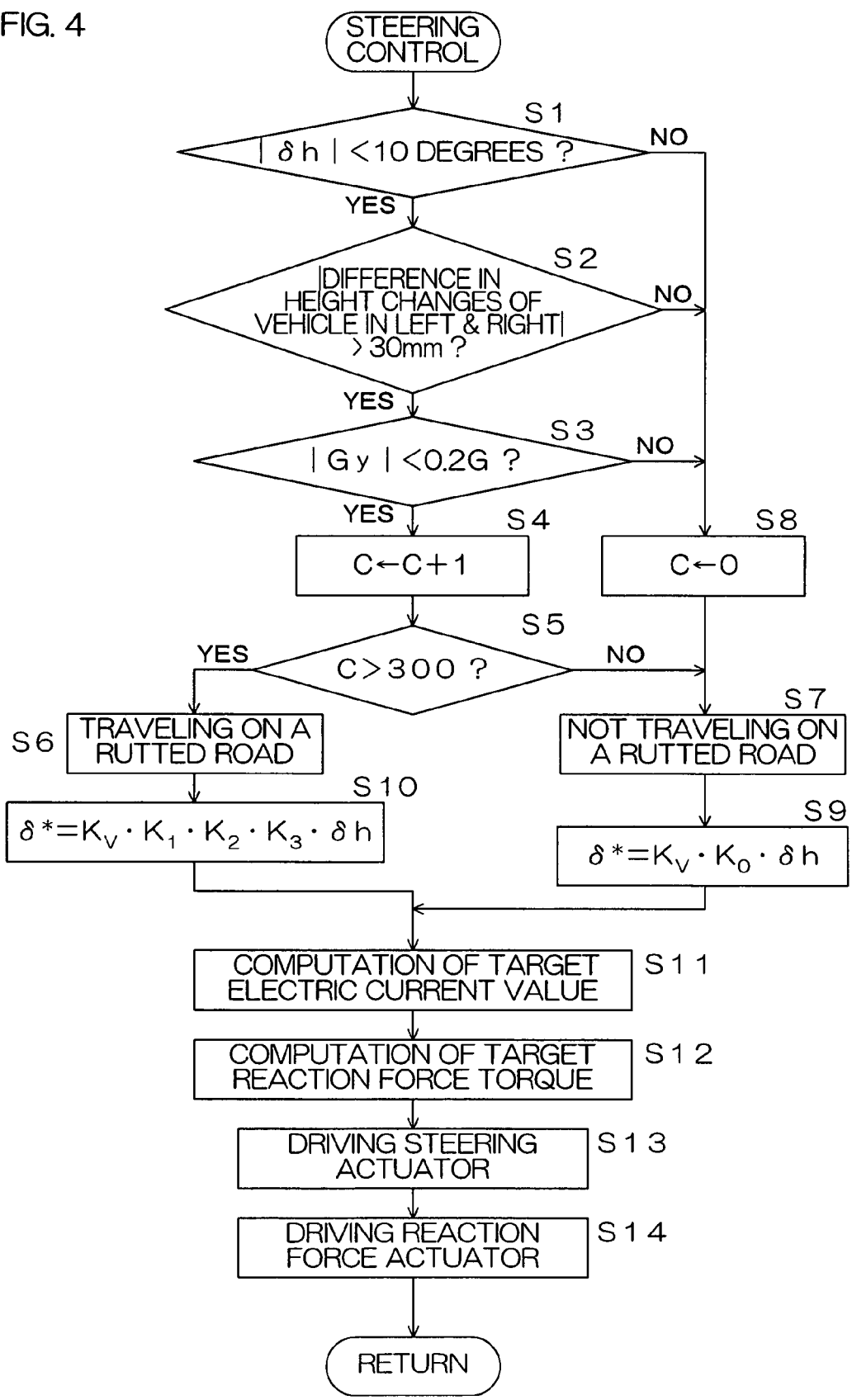
FIG. 4 is a flow chart for explaining steering control processing.

FIG. 4 is a flow chart for explaining processing that is repeatedly performed by the control device 20 in a predetermined control cycle. First, it is judged whether the operation angle absolute value |δh| is less than a predetermined value (for example, 10 degrees) or not by the rutted road judging section 34 (Step S1). That is, if the steering wheel 1 is in an almost neutral position or not is judged. When the operation angle absolute value |δh| is less than the predetermined value, that is, when the steering wheel 1 is in an almost neutral position (Step S1: YES), the rutted road judging section 34 subsequently judges whether an absolute value of the difference in height of the vehicle between left and right exceeds a predetermined value (for example, 30 mm) on the basis of outputs from the vehicle height sensors 17 and 18 (Step S2). When the absolute value of the difference in height of the vehicle between left and right exceeds the predetermined value, that is, when difference between left and right of the vehicle in distances between wheels and vehicle body is large and there is a high possibility that the vehicle is traveling on an uneven surface road (Step 2: YES), the rutted road judging section 34 further judges whether absolute value of lateral acceleration Gy detected by the lateral acceleration sensor 15 is less than a predetermined value (for example, 0.2 G. Here, "G" is gravity acceleration) (Step S3). This condition is satisfied when the vehicle is not turning (traveling almost straight).

In Step S3, when it is judged that the absolute value of the lateral acceleration Gy is less than the predetermined value (Step S3: YES), that is, when the steering wheel 1 is in almost neutral position and there is a high possibility that the vehicle is traveling on a rutted road and the vehicle is not turning, a counter for measuring duration time of such a condition increments a count value C by 1 (Step S4). Then, the rutted road judging section 34 judges whether the count value C exceeds a predetermined value (for example, 300) which corresponds to a predetermined time (for example, 0.5 sec.) or not (Step S5). When the count value C exceeds the predetermined value (Step S5: YES), the rutted road judging section 34 judges that the vehicle is traveling on a rutted road (Step S6), and otherwise (Step S5: NO) judges that the vehicle is not traveling on a rutted road (Step S7).

Moreover, when any of judgments in Steps S1, S2, and S3 is negative, count value C is cleared (Step S8) and the rutted road judging section 34 judges that the vehicle is not traveling on a rutted road (Step S7).

When the rutted road judging section 34 judges that the vehicle is not traveling on a rutted road (Step S7), the target steering angle computing section 31 computes a target steering angle δ* according to the afore-mentioned formula (1) (Step S9). Moreover, when the rutted road judging section 34 judges that the vehicle is traveling on a rutted road (Step S6), the target steering angle computing section 31 computes a target steering angle δ* according to the afore-mentioned formula (2) (Step S10). Thus, the target steering angle computing section 31 has a function of a steering ratio control unit which makes a steering angle ratio larger when traveling on a rutted road.

Using the target steering angle δ* thus obtained, a target electric current value i* is obtained by the target current computing section 33 (Step S11). The target current computing section 33 may be, for example, one that obtains a target electric current value i* by PI (proportional integration) control.

Furthermore, by the target reaction force torque computing section 32, target reaction force torque Tm* corresponding to an operation angle δh is obtained (Step S12). The target reaction force torque computing section 32 may be the one which is configured by a proportional control element and determines a target reaction force torque Tm* to be proportional to the operation angle δh between predetermined upper and lower limits.

When the target current value i* and the target reaction force torque Tm* are thus set, the control device 20 drives the steering actuator 2 in accordance with the target current value i* (Step S13) and drives the reaction force actuator 19 in accordance with the target reaction force torque Tm* (Step S14).

As described above, according to this embodiment, whether the vehicle is traveling on a rutted road or not is judged, and when traveling on a rutted road, ratio of steering angle δ to operation angle δh is more largely and swiftly changed than when traveling on an ordinary road. Due to this, driver's burden while traveling on a rutted road can be reduced, and at the same time, superior steering property and stability of vehicle behavior can be maintained regardless of the condition of a road because the vehicle does not wobble while traveling on an ordinary road.

Figure 5:
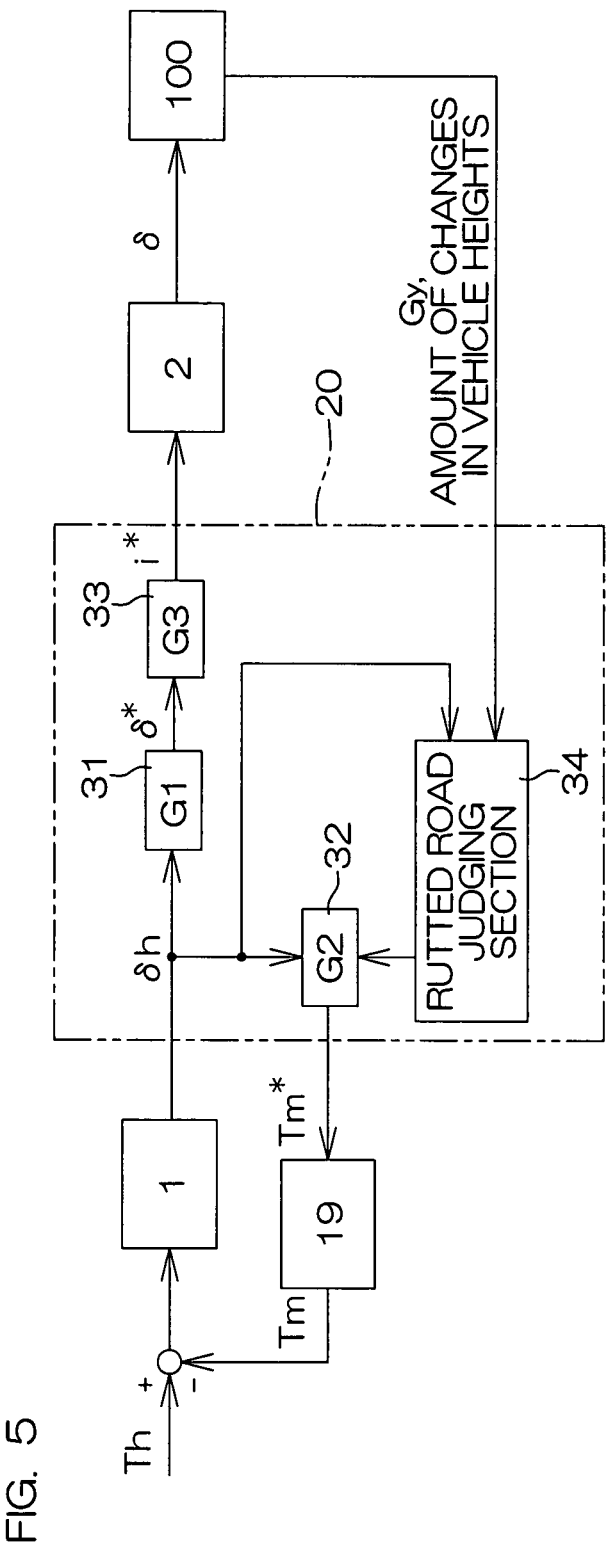
FIG. 5 is a control block diagram for explaining a second embodiment of the present invention.

FIG. 5 is a control block diagram for explaining a second embodiment of this invention. In the explanation of this embodiment, while referring to FIG. 1 used for explanation of the afore-mentioned first embodiment, in FIG. 5, the same reference numerals as those of FIG. 2 are used for the parts corresponding to the ones in the afore-mentioned FIG. 2.

In this embodiment, a reaction force actuator 19 is controlled so as to make operation reaction force given to a steering wheel 1 when traveling on a rutted road become smaller than when traveling on an ordinary road. By this, steering enhancement control or steering support control to reduce burden of a driver while traveling on a rutted road is performed.

More specifically, while a target steering angle computing section 31 computes a target steering angle δ* using the afore-mentioned formula (1) regardless of whether traveling on a rutted road or not, a target reaction force torque computing section 32 sets a smaller target reaction force torque Tm* when traveling on a rutted road than when traveling on an ordinary road according to a judgment result by a rutted road judging section 34. That is, when the target reaction force torque computing section 32 (operation reaction force control unit) is configured by, for example, a proportional control element and a target reaction force torque Tm* is set to be proportional to an operation angle δh between predetermined upper and lower limits, a smaller proportional gain (proportional constant) is applied when traveling on a rutted road than when traveling on an ordinary road.

Thus, while traveling on a rutted road, operation reaction force is reduced to reduce driver's burden of steering. By this, a driver can easily operate the steering wheel 1 dynamically and swiftly to stabilize the vehicle behavior.

Figure 6:
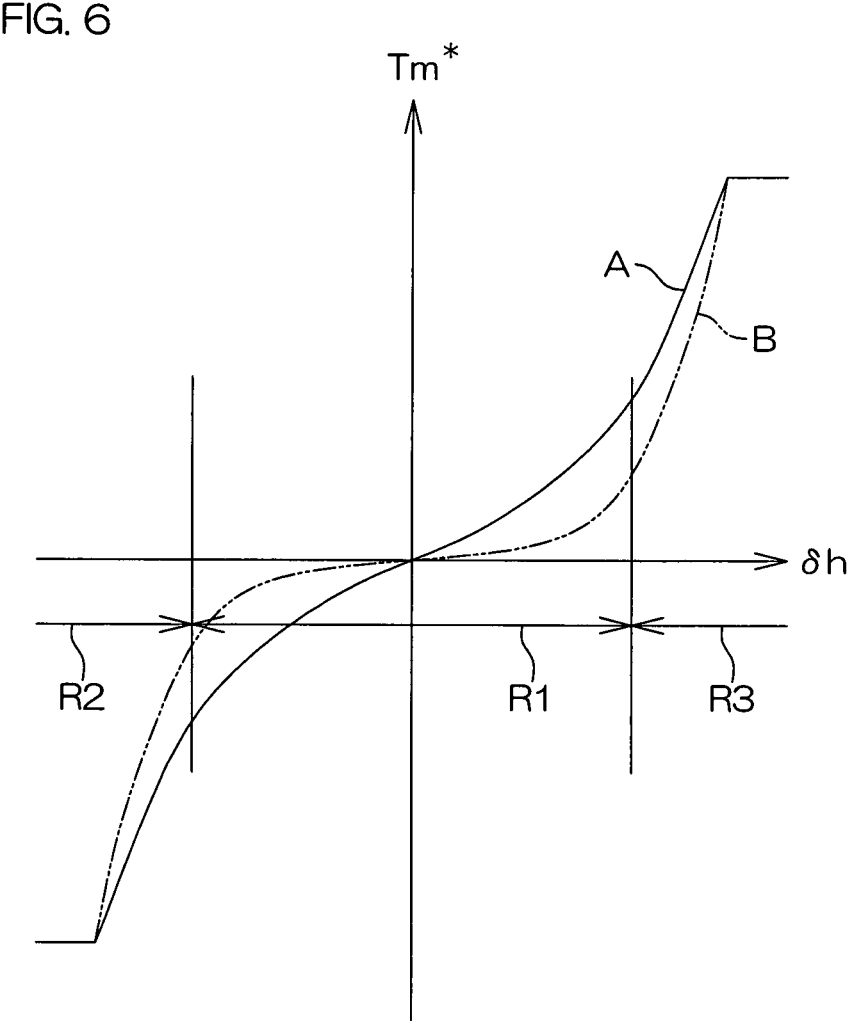
FIG. 6 shows an example of a target reaction force map.

The target reaction force torque computing section 32 does not need to be configured by a proportional control element and, for example, may be one that sets a target reaction force torque Tm* according to a reaction map shown in FIG. 6. In FIG. 6, curve A shows a reaction force map applied while traveling on an ordinary road, and curve B shows a reaction force map applied while traveling on a rutted road. By comparing curves A and B, it is understood that a target reaction force torque Tm* when traveling on a rutted road is set to be smaller than a target reaction force torque Tm* when traveling on an ordinary road. Moreover, difference between the target reaction force torques Tm* when traveling on a rutted road and when traveling on an ordinary road is set to be larger in an operation angle range R1 (operation angle range near neutral position) used for correction steering operation for letting the vehicle travel straight than operation angle ranges R2 and R3 which are more distant from the neutral position than R1. This is so because, when traveling on a rutted road, request for reducing steering burden at performing correction steering operation for letting the vehicle travel straight is large.

Figure 7:
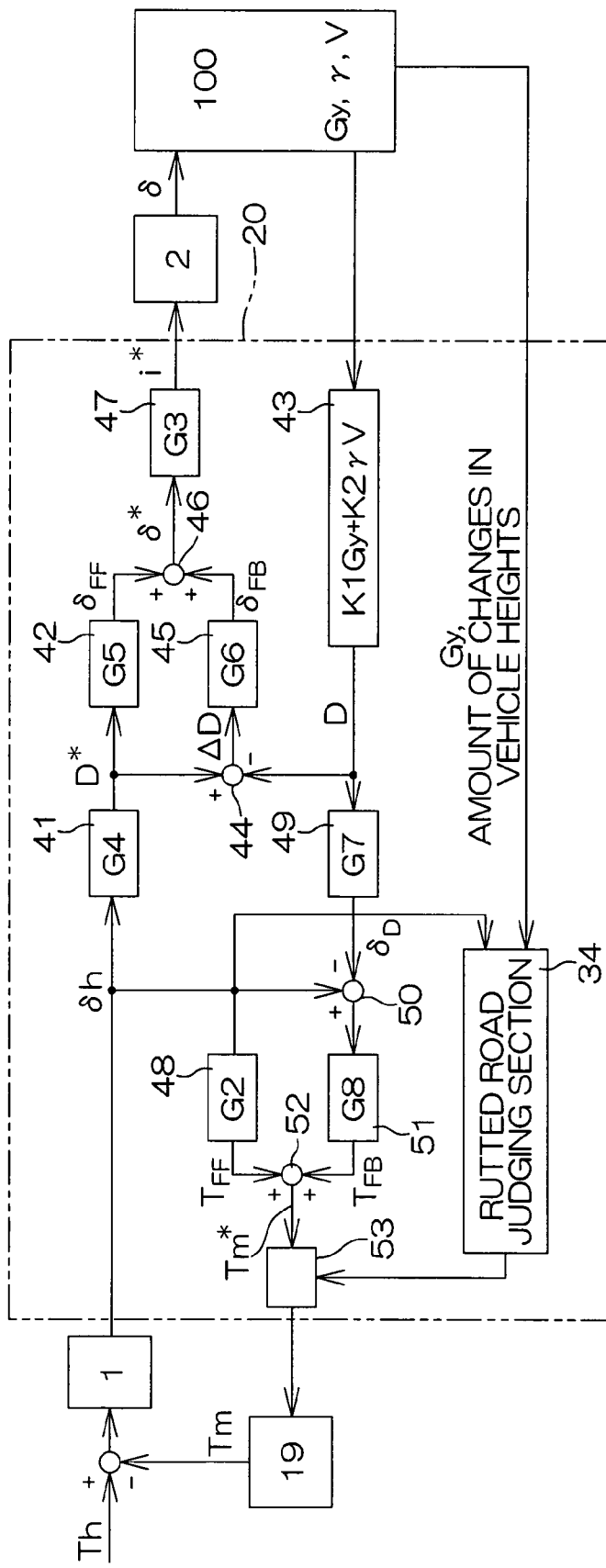
FIG. 7 is a control block diagram for explaining a third embodiment of this invention.

FIG. 7 is a control block diagram for explaining a third embodiment of the present invention. In this explanation of the embodiment, while referring to FIG. 1 used for explanation of the afore-mentioned first embodiment, in FIG. 7, the same reference numerals as those of FIG. 2 are used for the parts corresponding to the ones in the afore-mentioned FIG. 2.

In this embodiment, while vehicle behavior stabilization control is performed by control of a steering angle δ, a reaction force actuator 19 is controlled so as to make operation reaction force given to a steering wheel 1 when traveling on a rutted road become smaller than when traveling on an ordinary road. By this, steering enhancement control or steering support control to reduce burden of a driver while traveling on a rutted road is performed.

In this embodiment, using behavior index value D=K1·Gy+K2·γ·V (first-order linear coupling of lateral acceleration and yaw rate) as an index expressing vehicle behavior, vehicle behavior stabilization control is performed. Here, K1 is ratio of lateral acceleration summation and K2 is ratio of yaw rate summation and K1+K2=1. Ratio of K1 to K2 may be set so that behavior index value D corresponds to the change of behavior of the vehicle 100 caused by change of operation angle and may be fixed to, for example, K1=K2=0.5, or may be changed in accordance with vehicle speed or the like.

As functional processing units realized by software processing, a control device 20 includes a target behavior index value computing section 41 which obtains a target behavior index value D* corresponding to an operation angle δh, a steering angle setting section 42 which obtains a steering angle set value $δ_{FF}$ corresponding to the target behavior index value D*, a behavior index value computing section 43 which obtains a behavior index value D on the basis of the lateral acceleration Gy, yaw rate γ and vehicle speed V, a behavior index value difference computing section 44 which obtains difference ΔD of the behavior index value D to the target behavior index value D*, a steering angle correction value computing section 45 which obtains a steering angle correction value $δ_{FB}$ corresponding to the behavior index value difference ΔD, a set steering angle correcting section 46 which obtains a target steering angle δ* by correcting the steering angle set value $δ_{FF}$ by the steering angle correction value $δ_{FB}$, a target current computing section 47 which obtains a target electric current value i* corresponding to the target steering angle δ*, a reaction force setting section 48 which obtains a reaction force torque set value $T_{FF}$ corresponding to the operation angle δh, a behavior corresponding operation angle computing section 49 as obtains a behavior corresponding operation angle $δ_D$ as is a value of an operation angle corresponding to the behavior index value D, an operation angle difference computing section 50 which obtains a difference (δh−$δ_D$) between actual operation angle δh and the behavior corresponding operation angle $δ_D$, a reaction force correction value computing section 51 which obtains a reaction force correction value $T_{FB}$ corresponding to the operation angle difference (δh−$δ_D$), a set reaction force torque correcting section 52 which obtains a target reaction force torque Tm* by correcting the reaction force torque set value $T_{FF}$ with the reaction force correction value $T_{FB}$, the rutted road judging section 34, and a reaction force gain adjusting section 53 which adjusts gain to the target reaction force torque Tm* corresponding to a judgment result by the rutted road judging section 34.

The target behavior index value computing section 41 obtains the target behavior index value D*=G4·δh based on an operation angle δh detected by an angle sensor 11 and a transfer function G4. For example, it is assumed that the target behavior index value computing section 41 is configured by a proportional control element and a proportional gain thereof is proportional to the vehicle speed V. By this assumption, setting $K_{D1}$ as a proportional constant, following formula is established.

$$D^*=G4·δh=K1·Gy+K2γ·V=K_{D1}·V·δh$$

Therefore, the target behavior index value D* is computed so that the ratio of yaw rate γ of the vehicle 100 to the operation angle δh of the steering wheel 1 becomes constant regardless of vehicle speed V. The proportional constant $K_{D1}$ is adjusted so that optimum control can be performed and, for example, adjusted to be 4/3. The target behavior index value D* may be computed by setting transfer function G4 as a constant so that ratio of the lateral acceleration Gy of the vehicle 100 to the operation angle δh of the steering wheel 1 becomes constant regardless of the vehicle speed V.

The steering angle setting section 42 obtains a steering angle set value $δ_{FF}$=G5·D* using a target behavior index value D* and a transfer function G5. The transfer function G5 is, for example, a reciprocal of a stationary gain $G_D(V)$ of the lateral acceleration Gy to the operation angle δh, and therefore, $δ_{FF}$ equals to D*/$G_D(V)$. Gain $G_D(V)$ is defined by the following formula with SF as a stability factor and L as a wheel base.

$$G_D(V)=V^2/\{(1+SF·V^2)L\}$$

The stability factor SF and the wheel base L are values unique to the vehicle 100 and, for example, SF=0.0011 s²/m² and L=2.512 m.

The behavior index value computing section 43 obtains a behavior index value D (=K1·Gy+K2·γ·V) on the basis of lateral acceleration Gy detected by a lateral acceleration sensor 15, yaw rate γ detected by a yaw rate sensor 16, and a detected value of the vehicle speed V detected by a speed sensor 14.

The behavior index difference computing section 44 computes difference ΔD=(D*−D) between the target behavior index value D* computed by the target behavior index value computing section 41 and an actual behavior index value D computed by the behavior index value computing section 43.

The steering angle correction value computing section 45 computes a steering angle correction value $δ_{FB}$ corresponding to the difference ΔD on the basis of a transfer function G6 which defines a relationship between the difference ΔD and the steering angle correction value $δ_{FB}$. The transfer function G6 is set to be G6=(Kp+Ki/s)/$G_D(V)$ where Kp is proportional gain, Ki is integral gain and s is Laplace operator, and PI control is performed. The following formula is therefore established.

$$δ_{FB}=(Kp+Ki/s)·ΔD/G_D(V)$$

The proportional gain Kp and the integral gain Ki are adjusted so that optimum control can be performed, and for example, set to be Kp=3 and Ki=20.

The set steering angle correcting section 46 computes a target steering angle δ* as a sum of the steering angle set value $δ_{FF}$ obtained by the steering angle set section 42 and the steering angle correction value $δ_{FB}$ obtained by the steering angle correction value computing section 45. Therefore, since δ*=$δ_{FF}$+$δ_{FB}$, $δ_{FF}$=D*/$G_D(V)$, D*=$K_{D1}$·V·δh, when $δ_{FB}$=0 in a stationary state, relationship between the target steering angle δ* and the steering angle δh of the steering wheel 1 is expressed by the following formula.

$$\delta^* = \{K_{D1} \cdot V/G_D(V)\} \delta h$$

Function of the target current computing section 47 is the same as that of the target current computing section 33 in the first embodiment. That is, to obtain a target electric current value i*=G3·δ* on the basis of the target steering angle δ* computed by the set steering angle correcting section 46 and the transfer function G3.

Function of the reaction force setting section 48 is similar to that of the target reaction force torque computing section 32 in the first embodiment. That is, the reaction force setting section 48 obtains a reaction force torque set value $T_{FF}$=G2·δh on the basis of an operation angle δh detected by the angle sensor 11 and the transfer function G2.

The behavior corresponding operation angle computing section 49 computes a behavior corresponding operation angle $\delta_D$ which corresponds to the behavior index value D obtained by the behavior index value computing section 43, on the basis of a transfer function G7 which expresses relationship between the behavior index value D and the behavior corresponding operation angle $\delta_D$. The behavior corresponding operation angle computing section 49 can be configured by, for example, a proportional control element, and a proportional gain thereof is set to be a function Kδ (V) of the vehicle speed V, and therefore, $\delta_D$=Kδ(V)·D. Since D*=D in a stationary state, following formula is established.

$$\delta_D = K\delta(V) \cdot D = K\delta(V) \cdot K_{D1} \cdot V \cdot \delta h$$

Hence, for the operation angle δh of the steering wheel 1 to correspond to the behavior of the vehicle 100, that is, for $\delta_D$ to be equal to δh, following formula must be established.

$$K\delta(v) = 1/K_{D1} \cdot V$$

Thus, since $K_{D1}$ is a proportional constant, Kδ (V) is inversely proportional to the vehicle speed V, and therefore, Kδ (V)=¾ V is established.

The operation angle difference computing section 50 computes a difference between an operation angle δh detected by the angle sensor 11 and a behavior corresponding operation angle $\delta_D$ computed by the behavior corresponding operation angle computing section 49 (δh−$\delta_D$).

The reaction force correction value computing section 51 computes a reaction force torque correction value $T_{FB}$ which corresponds to the computed difference (δh−$\delta_D$) on the basis of a transfer function G8 which defines relationship between the difference (δh−$\delta_D$) and the reaction force torque $T_{FB}$. In this embodiment, the transfer function G8 is set to be G8= (Ktp+Kti/s) where Ktp is a proportional gain and Kti is an integral gain. For example, Ktp and Kti are set to be 1 and 0.0005, respectively.

The set reaction force torque correcting section 52 computes a target reaction force torque Tm* as a sum of the reaction force torque set value $T_{FF}$ set by the reaction force setting section 48 and the reaction force torque correction value $T_{FB}$. The control device 20 drive controls the reaction force actuator 19 via a driving circuit 23 so that the reaction torque Tm corresponds to the target reaction force torque Tm*.

The reaction force gain adjusting section 53 adjusts the target reaction force torque Tm* by multiplying a reaction force adjustment coefficient to the target reaction force torque Tm*. More specifically, receiving a judgment result from the rutted road judging section 34, the reaction force gain adjusting section 53 makes the reaction force adjustment coefficient smaller when traveling on a rutted road than when traveling on an ordinary road. More specifically, the reaction force gain adjusting section 53 sets the reaction force coefficient to be 1 when traveling on an ordinary road while setting the reaction force coefficient to be 0.8 when traveling on a rutted road. By this, reaction force is reduced when traveling on a rutted road than when traveling on an ordinary road. Therefore, operation burden of a driver is reduced. As a result, it is possible to enhance or assist stabilization of the vehicle behavior by the operation of the steering wheel 1.

Figure 8:
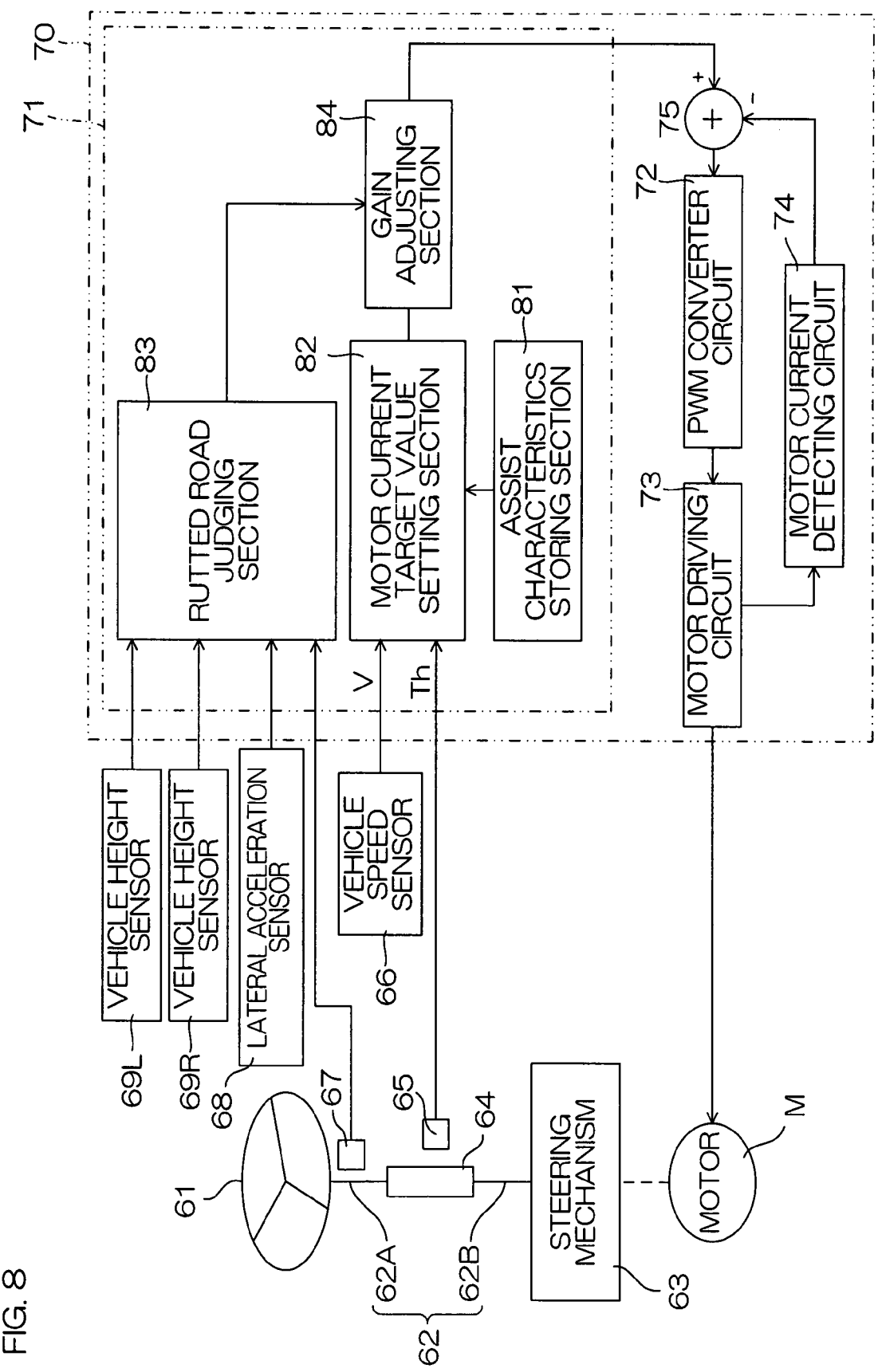
FIG. 8 is an explanatory diagram for explaining configuration of an electric power steering apparatus as a motor vehicle steering system according to a fourth embodiment of this invention.

FIG. 8 is an explanatory diagram for explaining configuration of an electric power steering apparatus as a motor vehicle steering system according to a fourth embodiment of the present invention. Operation torque added to a steering wheel 61, which serves as a steering member, is mechanically transmitted to a steering mechanism 63 via a steering shaft 62. To a steering mechanism 3, steering assist force is transmitted from an electric motor M (steering assist force generation unit, operation reaction force adjusting unit) as a steering assist actuator via a reduction mechanism (not shown) or by a direct drive system.

The steering shaft 62 is divided into an input shaft 62A connected to the steering wheel 61 side and an output shaft 62B connected to the steering mechanism 63 side, and the input shaft 62A and the output shaft 62B are connected with each other by a torsion bar 64. The torsion bar 64 generates distortion in accordance with operation torque Th, and direction and amount of the torsion is detected by a torque sensor 65. An output signal from the torque sensor 65 is inputted into a controller 70 (ECU: Electronic Control Unit) as a signal which expresses operation torque which is an example of operation amount.

Other than output signal from the torque sensor 65, vehicle speed signal outputted from a vehicle speed sensor 66, operation angle signal outputted from an operation angle sensor 67 which detects a rotation angle of the steering shaft 62 as an operation angle, lateral acceleration signal outputted from a lateral acceleration sensor 68, and vehicle height change amount signal outputted from vehicle height sensors 69L and 69R which detect vehicle height change amount in left and right of a vehicle are inputted into the controller 70.

The controller 70 sets an electric current command value as a motor driving value according to detected signals from sensors 65 to 68 and 69L and 69R, and drive controls the electric motor M so that steering assist force corresponding to operation torque Th and vehicle speed V is applied to the steering mechanism 63.

The controller 70 has a micro computer 71, a PWM (pulse width modulation) converter circuit 72, a motor driving circuit 73, a motor current detecting circuit 74 which detects electric current value flowing through the electric motor M, and a difference computing circuit 75. The micro computer 71 computes an electric current command value on the basis of operation torque Th detected by the torque sensor 65 and vehicle speed V detected by the vehicle speed sensor 66 and gives the value to the difference computing circuit 75. The difference computing circuit 75 obtains difference between motor current value detected by the motor current detecting unit 74 and the electric current command value and gives the difference to the PWM converter circuit 72. The PWM converter circuit 72 generates a PWM driving signal which corresponds to the difference obtained by the difference computing circuit 75 and inputs the signal into the motor driving circuit 73. The motor driving circuit 73 supplies electric current corresponding to the PWM driving signal to the electric motor M. Thus, driving force generated by the electric motor M is transmitted to the steering mechanism 63 as steering assist force.

The micro computer 71 has a central processing unit (CPU) and a memory, and functions as a plurality of functional processing sections when a predetermined program is run. The plurality of functional processing sections has an assist characteristics storing section 81, a motor current target value setting section 82, a rutted road judging section 83 and a gain adjusting section 84.

The assist characteristics storing section 81 stores reference assist characteristics (assist map) which set motor current target value corresponding to operation torque Th and vehicle speed V in advance.

The motor current target value setting section 82 obtains and outputs a motor current target value as a motor driving target value by applying operation torque Th detected by the torque sensor 65 and vehicle speed V detected by the vehicle speed sensor 66 to the reference assist characteristics stored in the assist characteristics storing section 81. Other than that, the motor current target value setting section 82 may be one which obtains a motor current target value by performing known compensation control computation such as inertia compensation control or damping control to a target value obtained from the reference assist characteristics.

The rutted road judging section 83 judges whether a vehicle is traveling on a rutted road or not on the basis of operation angle δh detected by the operation angle sensor 67, lateral acceleration Gy of a vehicle detected by the lateral acceleration sensor 68, and difference in height of a vehicle between left and right outputted from vehicle height sensors 69 L and 69R, and has substantially the same function as that of the rutted road judging section 34 in the afore-mentioned first embodiment.

The gain adjusting section 84 generates an electric current command value by multiplying gain to a motor current target value set by the motor current target value setting section 82, and switches the gain high and low depending on a judgment result by the rutted road judging section 83. More specifically, when it is judged by the rutted road judging section 83 that the vehicle is not traveling on a rutted road, the gain adjusting section 84 sets a first gain, and when it is judged by the rutted road judging section 83 that the vehicle is traveling on a rutted road, the gain adjusting section 84 sets a second gain which is larger than the first gain.

Thus, the gain adjusting section 84 functions as a steering enhancement control unit which enhances steering of vehicle wheels when traveling on a rutted road. Moreover, the assist characteristics storing section 81, the motor current target value setting section 82, and the gain adjusting section 84 constitute a steering assist control unit which makes steering assist force larger when the vehicle is traveling on a rutted road. In addition, when the steering assist force becomes larger, operation reaction force becomes smaller. As a result, the gain adjusting section 84 comes to have a function of an operation reaction force control unit which makes reaction force smaller when the vehicle is traveling on a rutted road.

By the configuration above, an electric current command value of which absolute value is larger when traveling on a rutted road than when traveling on an ordinary road is generated. Due to this, when traveling on a rutted road, a larger steering assist force is given to the steering mechanism 63, thereby more enhancing or assisting steering operation by a driver. As a result, operation reaction force that the driver feels through the steering wheel 61 becomes smaller, and the driver can operate the steering wheel 61 dynamically and swiftly with a small burden of steering to stabilize vehicle behavior.

Figure 9:
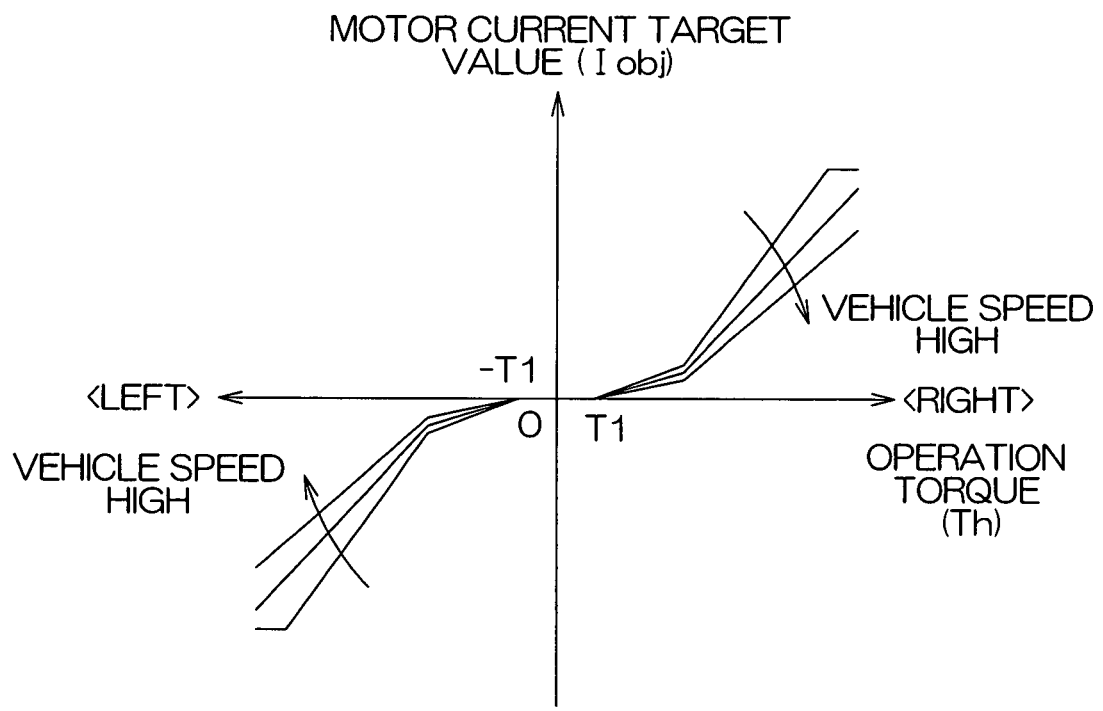
FIG. 9 shows a relationship (assist characteristic) of a motor current target value to steering torque.

FIG. 9 is a diagram for explaining function of the motor current target value setting section 82 and shows a relationship of a motor current target value Iobj to steering torque Th.

Regarding the steering torque Th, torque for steering rightward has a positive value while torque for steering leftward has a negative value. Moreover, the motor current target value Iobj is set to be a positive value when steering assist force is to be generated from the electric motor M for rightward steering, and when steering assist force is to be generated from the electric motor M for leftward steering, the value is set to be negative.

The motor current target value Iobj becomes positive to a positive value of the operation torque Th and becomes negative to a negative value of the operation torque Th. When the operation torque is a very small value within a range (torque dead zone) of between −T1 and T1 (for example, T1=0.4N·m), the motor current target value Iobj is set to be zero.

Furthermore, the absolute value of the motor current target value Iobj is set to be smaller as vehicle speed V detected by the vehicle speed sensor 66 becomes larger. By this setting, when traveling at low speed, large steering assist force can be generated, and when traveling at high speed, steering assist force can be small.

Relationship of the motor current target value Iobj to the operation torque Th is stored in the assist characteristics storing section 81 as a reference assist characteristic. The assist characteristics storing section 81 stores a plurality of reference assist characteristics which respectively corresponds to a plurality of vehicle speed ranges. The plurality of reference assist characteristics may be stored in a form of a map regarding operation torque Th and vehicle speed V in the assist characteristics storing section 81.

Four embodiments of this invention have been explained above. However, this invention can be implemented with other embodiments. For example, in the afore-mentioned first embodiment, operation angle δh is used as operation amount, and relationship between the operation angle δh and a target steering angle δ* is changed depending on whether the vehicle is traveling on a rutted road or not. However, operation torque Th may be used as operation amount, and relationship between the operation torque Th and the target steering angle δ* (ratio of the target steering angle δ* to the operation torque Th (steering ratio)) may be changed depending on whether the vehicle is traveling on a rutted road or not. Moreover, in the second and third embodiments, a configuration that obtains a target steering angle δ* or a target behavior index value D* on the basis of operation torque Th as operation amount may also be adopted.

In addition, in the first to third embodiments, a steer-by-wire system has been taken as an example. However, similar control is possible for a variable gear ratio type steering apparatus in which relationship between operation angle and steering angle is variable between a steering wheel and a steerable vehicle wheel. In this case, the steering wheel and the steerable vehicle wheel do not need to be mechanically separated and, for example, may be mechanically connected via a variable transmission ratio unit.

Moreover, in the afore-mentioned first embodiment, vehicle speed coefficient Kv is used for computation of a target steering angle δ*. However, instead of using the vehicle speed coefficient Kv, coefficients $K_o$, $K_1$, $K_2$, $K_3$ may be set as functions for vehicle speed V.

Furthermore, for example, control in the first or second embodiment and control in the third embodiment may be switched in accordance with vehicle speed V. That is, for example, a control switching unit which performs control in the first or second embodiment when vehicle speed V is in a range less than a predetermined vehicle speed threshold (for example, 10 Km/h), and, switches to the control in the afore-mentioned third embodiment when vehicle speed V is in a range more than the vehicle speed threshold may be provided.

Still furthermore, in the afore-mentioned fourth embodiment, gain adjustment is performed to a motor current target value set by the motor current target value setting section 82. However, instead of such gain adjustment, an assist map which expresses at least two kinds of assist characteristics including assist characteristics for traveling on a rutted road and assist characteristics for traveling on an ordinary road may be stored in the assist characteristics storing section 81. In this case, the motor current target value setting section 82 sets a motor electric current target value according to the assist map corresponding to the assist characteristics for traveling on a rutted road when the rutted road judging section 83 judges that the vehicle is traveling on a rutted road, and a motor current target value is set according to the assist map corresponding to the assist characteristics for traveling on an ordinary road when the rutted road judging section 83 judges that the vehicle is not traveling on a rutted road. Needless to say, the assist characteristics for traveling on a rutted road is set to be characteristics that correspond to a motor electric current target value that allows generation of larger steering assist force than the assist characteristics for traveling on an ordinary road.

Still furthermore, in the afore-mentioned fourth embodiment, an electric power steering apparatus is taken as an example. However, by a hydraulic power steering apparatus which includes a reaction force adjusting mechanism, similar effect can be obtained when a rutted road judging section which judges whether a vehicle is traveling on a rutted road or not is provided and operation reaction force is set to be smaller when traveling on a rutted road than when traveling on an ordinary road by adjusting the reaction force adjusting mechanism according to the judgment result by the rutted road judging section.

Yet still furthermore, in the afore-mentioned embodiments, an example in which whether a vehicle is traveling on a rutted road or not is judged on the basis of operation angle, difference in height change of a vehicle between left and right, and lateral acceleration has been explained. However, whether the vehicle is traveling on a rutted road or not can be judged by use of a structure which includes an imaging unit which takes a road surface image on the front side of a vehicle and an image processing unit which processes the image taken by the imaging unit and recognizes wheel ruts. In addition, an axial force sensor such as a deviation sensor may be attached to each of left and right tie rods to judge whether the vehicle is traveling on a rutted road or not on the basis of difference between left and right tie rod axial forces.

Embodiments of the present invention have been explained in detail. However, these are specific examples to disclose technical contents of the present invention and the present invention should not be understood within the limitation of these specific examples, and spirit and scope of the present invention is limited only by the attached claims.

The present application corresponds to Japanese Patent Application No. 2006-130438 which was submitted to the Japan Patent Office on the 9 May 2006. The disclosure of the application is incorporated herein by reference.

What is claimed is:

1. A motor vehicle steering system which steers vehicle wheels in response to an operation of an operation member for steering a vehicle, comprising:

a rutted road judging unit judging whether or not the vehicle is driving on a rutted road based on an operation amount of the operation member, a difference in heights between a first height based on a distance between a tire and a vehicle body on a left side, and a second height based on a distance between a tire and the vehicle body on a right side of the vehicle, and a lateral acceleration of the vehicle; and a steering enhancement control unit that switches a used transfer function from a first transfer function to a second transfer function and vice versa according to a result of judgment by the rutted road judging unit such that steering of vehicle wheels in response to operation of the operation member is enhanced, by applying the second transfer function, when the rutted road judging unit judges that the vehicle is driving on a rutted road as compared to when the first transfer function is applied based on the rutted road judging unit's judgment that the vehicle is not driving on a rutted road, wherein the steering enhancement control unit includes a steering ratio control unit that switches the used transfer function from the first transfer function to the second transfer function so as to increase a ratio of a target steering angle of the vehicle wheels to the operation amount of the operation member when traveling on a rutted road as compared to when the first transfer function is applied, and the first transfer function does not include a time differential component of the operation amount of the operation member while the second transfer function includes a time differential component of the operation amount of the operation member, wherein the steering enhancement control unit obtains as the target steering angle a first steering angle $\delta_1^*$ based on the operation amount $\delta h$ of the operation member according to the first transfer function, that is $\delta_1^* = K_v K_0 \delta h$, when the rutted road judging unit judges that the vehicle is not driving on a rutted road, while obtaining as the target steering angle a second steering angle $\delta_2^*$ based on the operation amount $\delta h$ of the operation member according to the second transfer function, that is $\delta_2^* = K_v K_1 K_2 K_3 \delta h$, when the rutted road judging unit judges that the vehicle is driving on a rutted road, and wherein $K_v$ is a coefficient that is a function of a vehicle speed, $K_0$ and $K_1$ are coefficients that are functions of the operation amount $\delta h$, $K_2$ is a coefficient that is a function of a time-based first-order differential value $\delta h'$ of the operation amount $\delta h$, and $K_3$ is a coefficient that is a function of a time-based second-order differential value of the operation amount $\delta h$.

2. The motor vehicle steering system according to claim 1, wherein the rutted road judging unit judges that the vehicle is driving on a rutted road if the operation amount of the operation member is less than a first predetermined value, the difference in heights exceeds a second predetermined value, and the lateral acceleration of the vehicle is less than a third predetermined value.

3. The motor vehicle steering system according to claim 1, further comprising vehicle height sensors that detect angles of suspension arms of the vehicle to determine the difference in heights.

4. The motor vehicle steering system according to claim 1, wherein the steering ratio control unit switches the used transfer function to said second transfer function to obtain the target steering angle based on the operation amount of the operation member.

5. The motor vehicle steering system according to claim 1, wherein the coefficient $K_v$ is set to be smaller as the vehicle speed becomes larger.

6. The motor vehicle steering system according to claim 1, wherein the coefficients $K_0$ and $K_1$ are set to be equal to each other.

7. The motor vehicle steering system according to claim 1, wherein the coefficients $K_0$ and $K_1$ are set such that the coefficient $K_1$ is larger than the coefficient $K_0$ with regard to an arbitrary operation amount $\delta h$.

8. The motor vehicle steering system according to claim 1, wherein the coefficients $K_0$ and $K_1$ are set such that the coefficients $K_0$ and $K_1$ are zero when the operation amount $\delta h$ equals to zero.

9. The motor vehicle steering system according to claim 1, wherein the coefficients $K_0$ and $K_1$ are set such that the coefficients $K_0$ and $K_1$ are larger as an absolute value of the operation amount $|\delta h|$ becomes larger.

10. The motor vehicle steering system according to claim 9, wherein the coefficients $K_0$ and $K_1$ are set such that an increasing rate of the coefficients $K_0$ and $K_1$ with respect to the absolute value of the operation amount $|\delta h|$ is small when the operation angle amount value $|\delta h|$ is within a range near a steering midpoint, while the increasing rate is large when the absolute value of the operation amount $|\delta h|$ is within a range near a steering end point.

11. The motor vehicle steering system according to claim 1, wherein the coefficient $K_2$ is not less than zero, and set to be zero when the time-based first-order differential value $\delta h'$ is zero.

12. The motor vehicle steering system according to claim 11, wherein the coefficient $K_2$ is set to be larger as an absolute value of the time-based first-order differential value $\delta h'$ becomes larger.

13. The motor vehicle steering system according to claim 1, wherein the coefficient $K_3$ is not less than zero, and set to be zero when the time-based second-order differential value $\delta h''$ is zero.

14. The motor vehicle steering system according to claim 13, wherein the coefficient $K_3$ is set to be larger as an absolute value of the time-based second-order differential value $\delta h''$ becomes larger.

15. The motor vehicle steering system according to claim 1, further comprising a target electric current computing section that computes a target electric current value that is used to supply electric current to a steering actuator within the steering system.

16. The motor vehicle steering system according to claim 1, further comprising a target reaction force torque computing section that determines a target reaction force torque used to drive a reaction force actuator within the steering system.

* * * * *